United States Patent
Sato (10) Patent No.: US 8,345,951 B2
(45) Date of Patent: Jan. 1, 2013

(54) IMAGE BINARIZING METHOD, IMAGE PROCESSING DEVICE, AND COMPUTER PROGRAM

(75) Inventor: Junya Sato, Sapporo (JP)

(73) Assignee: Tokyo Electron Limited, Tokyo (JP)

(*) Notice: Subject to any disclaimer, the term of this patent is extended or adjusted under 35 U.S.C. 154(b) by 912 days.

(21) Appl. No.: 12/227,301

(22) PCT Filed: May 16, 2007

(86) PCT No.: PCT/JP2007/060013
§ 371 (c)(1), (2), (4) Date: Nov. 12, 2008

(87) PCT Pub. No.: WO2007/132880
PCT Pub. Date: Nov. 22, 2007

(65) Prior Publication Data
US 2009/0208132 A1    Aug. 20, 2009

(30) Foreign Application Priority Data
May 16, 2006    (JP) .................................. 2006-137055

(51) Int. Cl.
*G06K 9/00* (2006.01)
(52) U.S. Cl. .................... 382/151; 324/750.18; 359/847
(58) Field of Classification Search .................. 382/151; 359/847
See application file for complete search history.

(56) References Cited

U.S. PATENT DOCUMENTS

| | | | | |
|---|---|---|---|---|
| 5,644,245 A | * | 7/1997 | Saitoh et al. | 324/750.18 |
| 5,955,877 A | * | 9/1999 | Farnworth et al. | 324/750.23 |
| 2005/0232479 A1 | * | 10/2005 | Obi | 382/151 |
| 2005/0267366 A1 | | 12/2005 | Murashita et al. | |
| 2006/0238905 A1 | * | 10/2006 | Kurihara et al. | 359/847 |

FOREIGN PATENT DOCUMENTS

| | | |
|---|---|---|
| JP | H04-078969 A | 3/1992 |
| JP | H07-271975 A | 10/1995 |
| JP | 2005-045194 A | 2/2005 |
| JP | 2006-190974 A | 7/2006 |
| JP | 2007-114073 A | 5/2007 |

OTHER PUBLICATIONS

Office Action of KR10-2008-7015911 mailed on Feb. 26, 2010 Total 2 pages, Issued by Korean Patent Office.

* cited by examiner

*Primary Examiner* — Hadi Akhavannik
(74) *Attorney, Agent, or Firm* — Pearne & Gordon LLP (57) ABSTRACT

A binarizing method for binarizing an original image of an electrode pad on a substrate. The method includes the steps of processing an electrode image to generate a binary image of the electrode by binarzing the original image with a first threshold value, calculating a contact trace area to calculate the contact trace area including a portion that is predicted to be a trace of an object that contacted the electrode from the binary image of the electrode, processing a contact trace image to generate the contact trace area binary image by binarizing the original image of the area extracted by the contact trace area extracting unit with a second threshold value different from the first threshold value, and synthesizing the images to synthesize the binary image of the electrode and the contact trace area binary image by taking a logical sum on a corresponding pixel to pixel basis.

9 Claims, 9 Drawing Sheets

IMAGE BINARIZING METHOD, IMAGE PROCESSING DEVICE, AND COMPUTER PROGRAM

This application is a national phase application under 35 U.S.C. §371 of international application Ser. No. PCT/JP2007/060013, filed May 16, 2007, and claims priority under 35 U.S.C. §119 to Japanese patent application No. 2006-137005, filed May 16, 2006, both of which are hereby expressly incorporated by reference in their entirety.

TECHNICAL FIELD

The present invention relates to an image binarizing method and image processing device, and more specifically, relates to an image binarizing method and image processing device used for image recognition of a probe trace on an electrode pad.

BACKGROUND ART

In semiconductor manufacturing techniques, an inspection of a chip which is processed in a wafer state, has been performed.

When inspecting each chip in a wafer state, electrical operations of the chip on a semiconductor wafer is examined by pressing a probe for inspection to an electrode pad on the chip. At this time, a probe trace is formed on the electrode pad of the chip. There is a technique to determine whether the inspection of the chip is performed properly or not by imaging this probe trace and analyzing the pattern of the probe trace for the obtained image (patent document 1).

To determine whether the inspection is performed properly or not by the probe trace, it is necessary to accurately recognize the image of the probe trace including its position. Normally, the image of the electrode pad is binarized, and the position, shape and size of the probe trace is recognized from the binary image.

The conventional image binarizing method is to set a single threshold value to the entire binary image and binarize the image by using the threshold value. Further, as disclosed in patent document 2, there is a method for binarizing an image by setting a threshold value for each micro region.

Patent document 1: Japanese Unexamined Patent Application Publication No. 2005-45194.
Patent document 2: Japanese Unexamined Patent Application Publication No. H4-78969.

DISCLOSURE OF INVENTION

Problems to be Solved by the Present Invention

To determine whether the inspection of a chip by the probe is performed properly or not from the probe trace, it is necessary to accurately recognize (extract) the pattern of the probe trace. However, there are irregularities of density in the electrode pad, which is a background of the probe trace, and further more, the probe trace varies in size, shape and density. For this reason, when an image is binarized by using a single threshold value, there has been a problem of a portion of the background is recognized as a probe trace or conversely, a portion of the probe trace is recognized as a background. Further, even the threshold value of the binary is set by each micro region, and it is difficult to judge whether the obtained pattern is a probe trace or the portion where the color of the pad is dark.

The present invention has been made considering the above situations, and an objective is to recognize the probe trace with a high degree of accuracy.

Further, another objective of the present invention is to provide an image binarizing method capable of recognizing the probe trace with a high degree of reliability.

SUMMARY OF THE INVENTION

In order to achieve above objectives, an image binarizing method according to an aspect of the invention is the image binarizing method for binarizing an original image of an electrode pad on a substrate, and the method includes the steps of:

processing electrode image to generate a binary image of electrode by binarizing the original image with a first threshold value;

extracting a contact trace area to obtain the contact trace area including a portion that is predicted to be a trace of object contacting the electrode from the binary image of electrode;

processing a contact trace image to generate a contact trace area binary image by binarizing the original image of area corresponding to the contact trace area obtained in the step for extracting the contact trace area with a second threshold value different from the first threshold value; and synthesizing images to synthesize the binary image of electrode and the contact trace area binary image.

The step for synthesizing images is to synthesize the binary image of electrode and the contact trace area binary image on a corresponding pixel to pixel basis, for example. Alternatively, the step for synthesizing images is to synthesize the binary image of electrode and the contact trace area binary image by taking logical sum on a corresponding pixel to pixel basis.

The step for extracting the contact trace area is to make an area circumscribing the black color area that has the largest area in the electrode binary image to the contact trace area. This circumscribing area is in a rectangular shape, for example.

For example, the first threshold value in the step for processing the electrode image is a brightness between the maximal value of a low brightness and the maximal value of a high brightness in a frequency distribution of brightness of the pixel of the original image and the second threshold value in the step for processing the contact trace image is a brightness between the first threshold value and the maximal value of the high brightness. For example, the first threshold value is a brightness of minimal frequency between the maximal value of the low brightness and the maximal value of the higher brightness.

In order to achieve above objectives, an image processing device according to a second aspect of the invention includes:

an electrode image processing unit for generating a binary image of an electrode by binarizing the original image with a first threshold value;

a contact trace area extracting unit for extracting the original image of contact trace area including a portion that is predicted to be a trace of object contacting the electrode from the binary image of the electrode;

a contact trace image processing unit for generating a contact trace area binary image by binarizing the original image of the area extracted by the contact trace area extracting unit with a second threshold value different from the first threshold value; and an image synthesizing unit for synthesizing the electrode binary image and the contact trace area binary image.

The image synthesizing unit, for example, synthesizes the binary image of the electrode and the contact trace area binary image on a corresponding pixel to pixel basis. A synthesizing method is to take a logical sum on a corresponding pixel to pixel basis, for example.

The contact trace area extracting unit makes an area circumscribing the black color area that has the largest area in the electrode binary image to the contact trace area. This circumscribing area is in a rectangular shape, for example.

For example, the first threshold value in the step for processing the electrode image is a brightness between the maximal value of a low brightness and the maximal value of a high brightness in a frequency distribution of brightness of the pixel of the original image and the second threshold value in the step for processing the contact trace image is a brightness between the first threshold value and the maximal value of the high brightness. For example, the first threshold value is a brightness of minimal frequency between the maximal value of the lower brightness and the maximal value of the higher brightness.

A computer program of the present invention for operating a computer, including:

an electrode image processing unit for generating a binary image of an electrode by binarizing an original image with a first threshold value;

a contact trace area extracting unit for extracting the original image of a contact trace area including a portion that is predicted to be a trace of an object contacting the electrode from the binary image of the electrode;

a contact trace image processing unit for generating a contact trace area binary image by binarizing the original image of the area extracted by the contact trace area extracting unit with a second threshold value different from the first threshold value; and a image synthesizing unit for synthesizing the electrode binary image and the contact trace area binary image.

This program may be executed by storing the program in a hard disk device of a computer, or distributed and executed by storing the program on a memory medium, such as DVD.

EFFECT OF THE PRESENT INVENTION

According to the image binarizing method and image processing device of the present invention, the original image of the probe trace area is synthesized by binarizing with a different threshold value. By extracting the probe trace using this synthesized image, the probe trace can be recognized with a high degree of reliability and accuracy.

EXPLANATION OF SYMBOLS

1 Inspection device
2 Inspection control unit, image processing device
4 Probe card
4a Probe
8 Wafer (substrate)
8a Electrode pad
9 Substrate imaging device
16 Chip
20 Internal bus
21 Control unit
22 Main memory unit
23 External memory unit
24 Operating unit
25 Input/output
26 Display
31 Binarizing unit
32 Predicted probe trace area calculating unit
33 Area binarizing unit
34 Image synthesizing unit
35 Image data holding unit
36 Original image
37 Electrode binary image
38 Probe trace area binary image
39 Probe trace recognition binary image

DETAILED DESCRIPTION OF INVENTION

An inspection device pertaining to an embodiment of the present invention will be explained referring to the figures.

Figure 1:
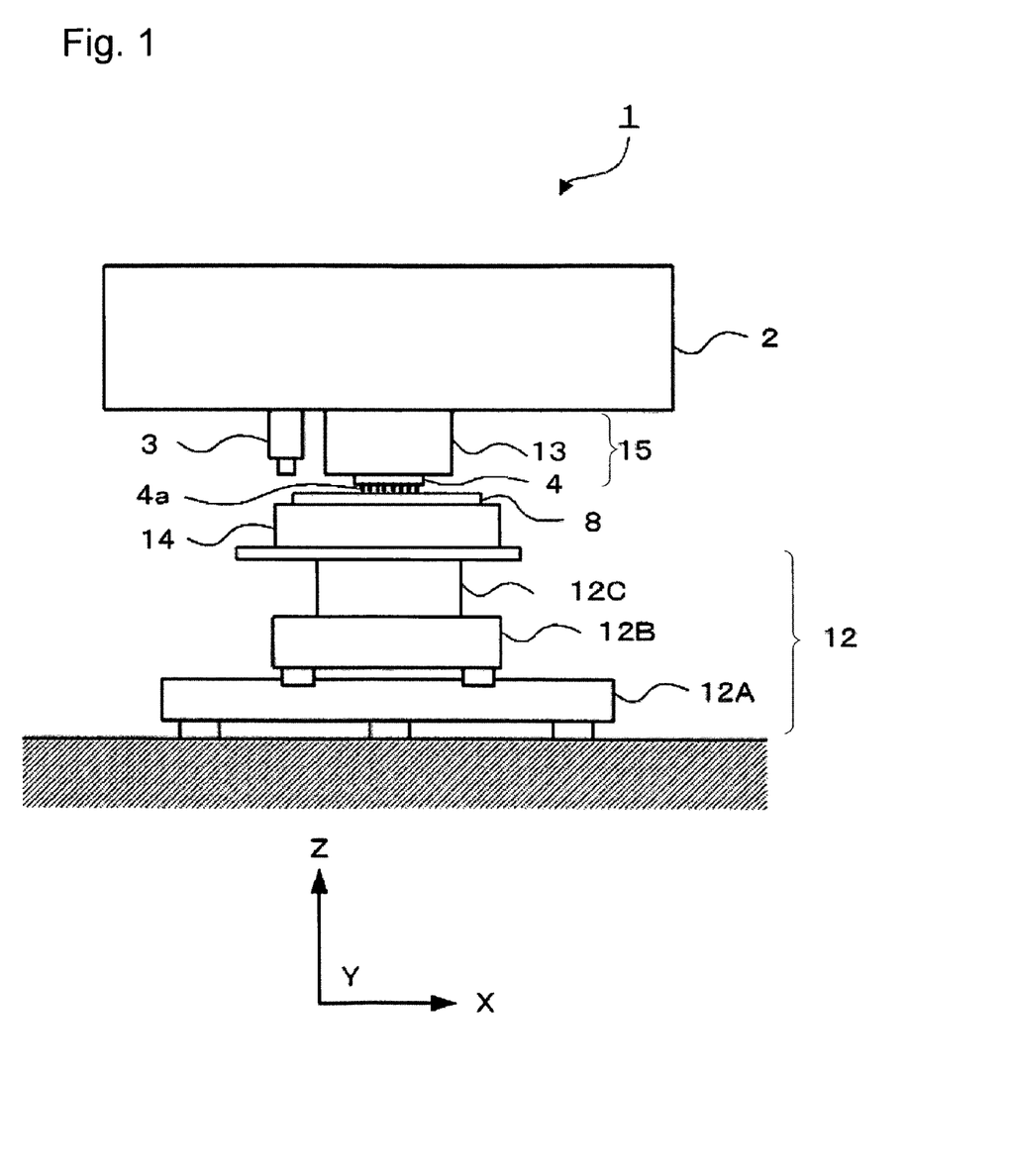
FIG. 1 is a configuration diagram of an inspection device for a substrate pertaining to an embodiment of the present invention.

As shown in FIG. 1, an inspection device 1 is provided with a loader unit 12, a testing unit 15, imaging section 3, and an inspection control unit 2. The inspection control unit 2 also serves as an image processing device.

The loader unit 12 transfers a wafer 8, which is a testing object. The loader unit 12 is, for example, provided with a placing section (not shown) to place a cassette storing 25 wafers 8, and a wafer transfer system for transferring the wafer 8 piece by piece from the cassette on this placing section. The wafer 8 as an inspection object is fixed on a stage 14 attached on the loader unit 12.

The loader unit 12 moves the stage 14 in three axes directions by X Y Z tables 12A, 12B and 12C, which are a moving system for the orthogonal three axes (X-axis, Y-axis and Z-axis), and also rotates the stage 14 around the Z-axis. Concretely, the loader unit 12 has the Y table 12A moving in a Y direction, X table 12B moving over this Y table 12A in a X direction, and the Z table 12C moving vertically in a Z direction which is arranged by aligning the center of this X table 12 and the center of axis, and the stage 14 is moved in X, Y, and Z directions. Further, the stage 14 rotates in forward and reverse directions in a predetermined range through a rotation drive system around the Z axis.

Figure 3:
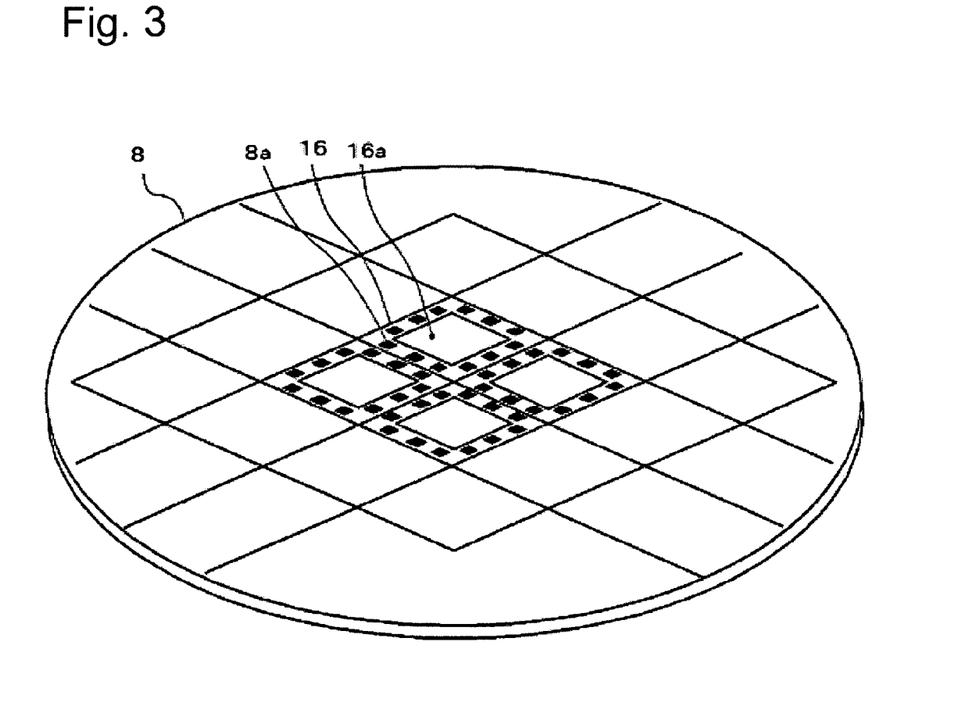
FIG. 3 is a partial view of an example of a wafer (substrate).
Figure 4:
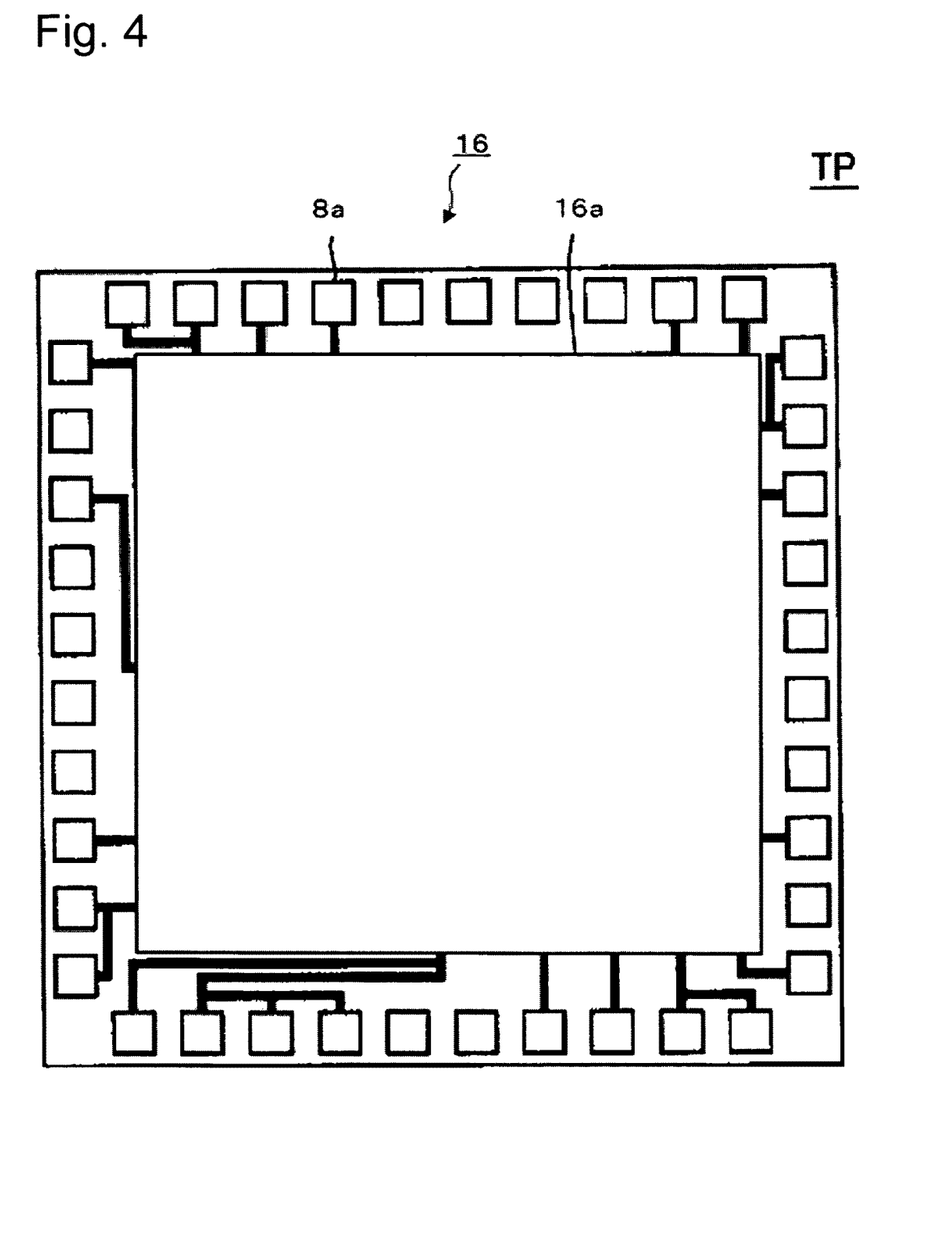
FIG. 4 is a plane view illustrating an example of a chip formed on a wafer.

The testing unit 15 is provided with a probe card 4 and a probe control section 13 for controlling the probe card 4. As shown in FIG. 3, chips 16 to be inspected are formed in a matrix on the wafer 8. On the chip 16, formed are a semiconductor integrated circuit 16a and an electrode pad 8a for bonding a wire to inputs/outputs for passing an electric signal as shown in FIGS. 3 and 4. The electrode pad 8a is formed from, for example, a conductive metal, such as copper, copper alloy, aluminum etc.

The probe card 4 shown in FIG. 1 contacts the probe 4a with the electrode pad 8a formed on the chip 16, applies a signal (e.g. test pattern signal) for measuring the characteristics of the chip 16, and takes out a reply signal from the chip 16 through the probe 4a.

The testing unit 15 is provided with an alignment system (not shown) for aligning the probe 4a of the probe card 4 and the wafer 8. The testing unit aligns the probe 4a of the probe card 4 and the electrode pad 8a of the wafer 8, and then electrically connects them to measure the characteristics of the chip 16 formed on the wafer 8.

When inspecting the chip 16, the testing unit 15 contacts the probe 4a to the electrode pad 8a with an adequate needle pressure to decrease contact resistance. For this reason, a probe trace remains on the electrode pad 8a from the contact of the probe 4a. After inspecting the chip 16, the inspection device 1 determines the position, size and shape of the probe trace by the probe 4a from an image of the electrode pad 8a. When the probe trace is formed in a normal shape in a predetermined range of the electrode pad 8a, the inspection device 1 determines that the inspection of the chip 16 is performed properly.

When imaging the wafer 8, the inspection device 1 switches the testing unit 15 and imaging section 3 so as to face the imaging section 3 to the wafer 8, or moves the stage 14 to the imaging section 3 side so as to face the wafer 8 to the imaging section 3. The imaging section 3 takes an image of the wafer 8 according to the command of the inspection control unit 2 and supplies the image data obtained from imaging to the inspection control unit 2.

For example, the camera 3 is formed from a digital still camera, such as, a CCD (Charge Couple Device) camera, CMOS (Complimentary Metal Oxide Semiconductor) camera etc. The camera 3 takes the image of wafer 8 responding to the command of the inspection control section 2, and supplies the image data obtained from imaging to the inspection control unit 2. When taking the image of wafer 8 with the camera 3, there may be cases where the image is taken while the wafer 8 is still, or the image is taken while moving the stage 14. The camera 3 preferably has an autofocus system and a lighting device. The camera 3 may take an image of the subject with a light, other than a visible light, such as infrared rays.

The inspection control section 2 is formed from a computer device to control the operation of the entire inspection device 1.

Next, explained is a circuit configuration of a section in the inspection device 1 having the configuration described above where it is determined whether the inspection of the chip 16 by the prober 15 is properly performed or not by using the image obtained from imaging (hereinafter referred as a substrate imaging device 9).

Figure 2:
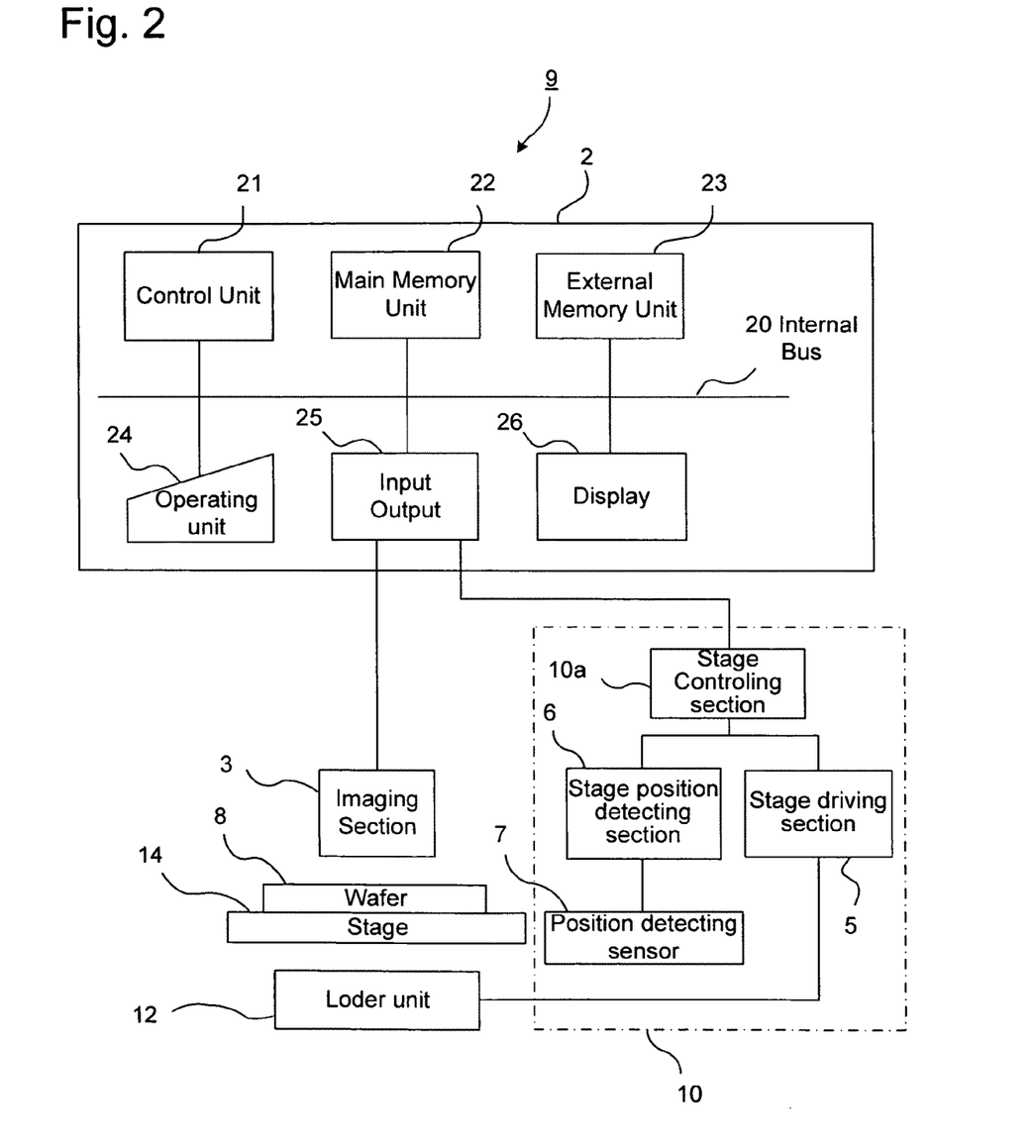
FIG. 2. is a block diagram illustrating a configuration of a substrate imaging device in the inspection device of FIG. 1.

As shown in FIG. 2, the substrate imaging device 9 includes an image processing device (inspection control unit) 2, imaging section 3, stage controlling device 10, loader unit 12, and stage 14. The stage controlling device 10 is formed from a stage controlling section 10a, stage driving section 5, stage position detecting section 6, and position detecting sensor 7. The stage controlling device 10 is a part of the testing unit 15 and commonly used in the testing unit 15 and the substrate imaging device 9.

The image processing device 2, which is also the inspection control unit, is provided with a control unit 21, main memory unit 22, external memory unit 23, operating unit 24, input/output 25 and display 26 as shown in FIG. 2. The main memory unit 22 and external memory unit 23, operating unit 24, input/output 25 and display 26 are connected to the control unit 21 thorough an internal bus 20.

The control unit 21 is formed from a CPU (Central Processing Unit) etc. and takes an image of the electrode pad formed on the wafer 8, extracts a probe trace by binarizing the image, and executes a process to determine whether the inspection of the chip is performed normally or not according to a program stored in the external memory unit 23.

The main memory unit 22 is formed from RAM (Random-Access memory) etc., loads the program stored in the external memory unit 23, and is used as a work area of the control unit 21.

The external memory unit 23 is formed from a nonvolatile memory, such as, ROM (Read Only Memory), flash memory, a hard disk, DVD-RAM (Digital Versatile Disc Random-Access Memory), DVD-RW (Digital Versatile Disc Rewritable) etc. The external memory unit 23 stores the program for the control unit 21 to perform the process described above in advance, supplies the data stored in this program to the control unit 21, and stores the data supplied from the control unit 21.

The operating unit 24 is formed from a keyboard, a pointing device etc., such as mouse, and an interface device connecting the keyboard and pointing device etc. to the internal bus 20. Through the operating unit 24, a start of evaluation measurement or selection of measuring method etc. are input and supplied to the control unit 21.

The input/output 25 is formed from a serial interface or LAN (Local Area Network) interface for connecting the stage controlling unit 10 and imaging section 3 that are controlled by the inspection controlling device 2. Through the input/output 25, a command to move the wafer is given to the stage control device 10, and the positioning information of the stage is input from the stage position detection section through the stage control section 10a. Further, an instruction to image is output to the imaging section 3 and image data is input from the imaging section 3.

The display 26 is formed from a CRT (Cathode Ray Tube) or LCD (Liquid Crystal Display) etc. to display a taken image or the result of a determination of normality of the inspection.

The imaging section 3 is formed from a digital camera provided with an autofocus mechanism and lighting device etc. In some cases, the imaging is performed with an infrared light etc. in addition to visible lights.

The stage driving section 5 is a drive circuit for driving the actuator of the loader section 12. The stage driving section 5 drives the loader section 12 to each axis direction according to an instruction of the stage controlling section (controller) 10a based on the setting data of the inspection control unit 2. The stage position detecting section 6 inputs a signal from the position detecting sensor 7 detecting the position of the stage 14 and supplies the stage position data to the inspection control unit 2 through the stage control section 10a. The stage position detecting section 6 detects the position of the X-axis and Y-axis directions of the stage 14.

The position detecting sensor 7 is, for example, formed from an actuator or pulse encoder mounted with a ball screw, or a linear scale attached to each table of the loader section 12, or an optical distance measuring device, such as a laser measurement.

Next, a method for binarizing an image according to the embodiment is hereinafter explained.

Figure 5:
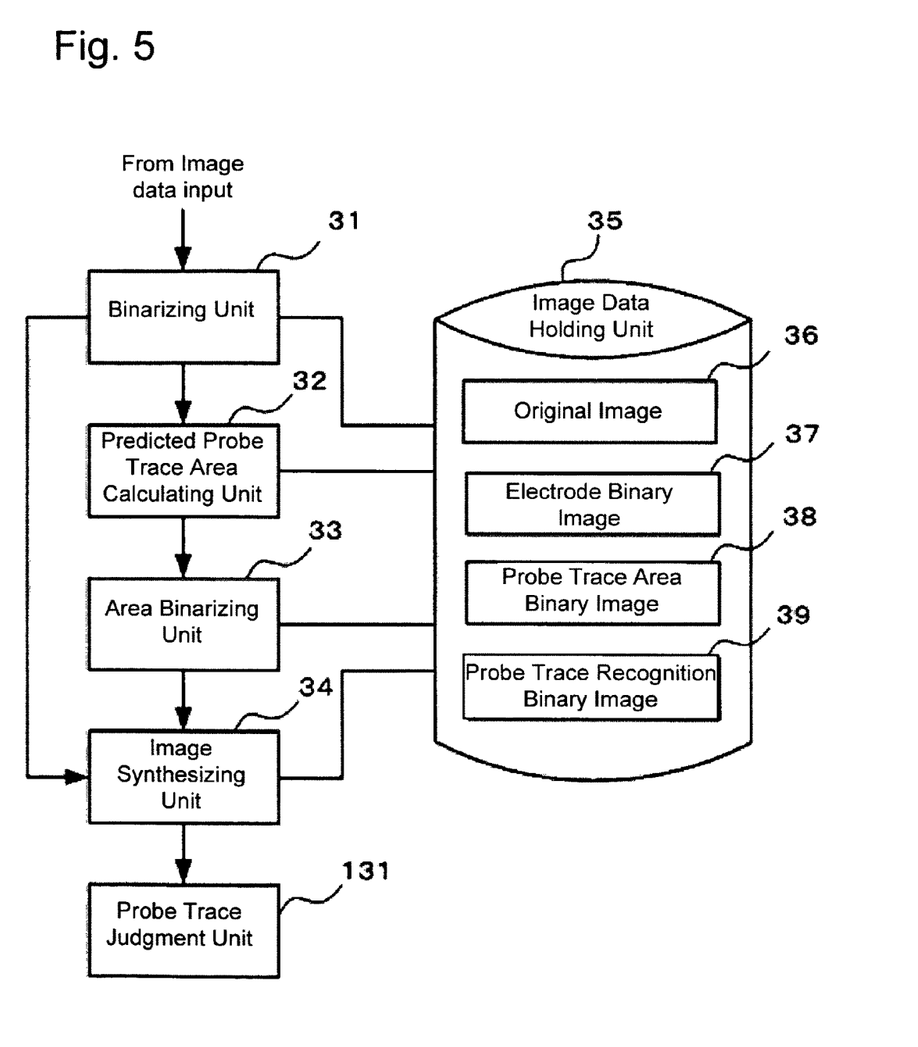
FIG. 5 is a block diagram illustrating a logical configuration of an image processing device pertaining to an embodiment.

FIG. 5 is a block diagram showing a logical configuration of the image processing device 2. The image processing device 2 is formed from binarizing unit 31, predicted probe trace area calculating unit 32, area binarizing unit 33, image synthesizing unit 34 and image data holding unit 35. The image data holding unit 35 memorizes and retains an original image 36 of the electrode pad, electrode binary image 37, probe trace area binary image 38 and probe trace recognition binary image 39.

The binarizing unit 31, predicted probe trace area calculating unit 32, area binarizing unit 33 and image synthesizing unit 34 are included in the control unit 21 of the inspection control unit 2, and a computer program operates on the control unit 21, for example. Further, the image data holding unit 35 is included in the main memory unit 22 and/or external memory unit 23 of the inspection control unit 2.

The binarizing unit 31 binarizes the captured original image 36 with a threshold value to convert it into a black and white binary image. The original image 36 is input from the imaging section 3 or input/output 25 and stored in the image data holding unit 35. Alternatively, the original image 36 is set to the image processing device 2 while stored in the memory device.

The binarizing unit 31 binarizes the original image 36 with a threshold value α of a relatively low brightness so as to make the background of the electrode pad in the original image 36 white. The binarizing unit 31 stores the binary image in the image data holding unit 35 as the electrode binary image 37.

The predicted probe trace area calculating unit 32 calculates the area predicted to be a probe trace from the electrode binary image 37. For example, the predicted probe trace area calculating unit 32 regards connecting black pixels of the electrode binary image 37 as one cluster and the cluster of the highest pixel counts among the clusters of black pixels as a predicted probe trace. The predicted probe trace area calculating unit 32 regards a rectangular area that circumscribes to that predicted probe trace as the predicted probe trace area. The predicted probe trace area calculating unit 32 inputs the information on the position and size of the predicted probe trace area in the original image into the area binarizing unit 33.

The area binarizing unit 33 binarizes the predicted probe trace area out of the original image 36 with a threshold value β different from the threshold value α described above. Especially, by using a brightness higher than the threshold value α as the threshold value β, the area binarizing unit 33 compensates the portion missing from the binarization by the binarzing unit 31 because the brightness is close to the irregularity on the background of the electrode pad 8. The area binarizng unit 33 regards the pixels other than the probe trace area as white pixels. The area binarizing unit 33 stores the binary image in the image data holding unit 35 as the probe trace area binary image 38.

The image synthesizing unit 34 synthesizes the electrode binary image 37 and probe trace area binary image 38 by taking a logical sum on a corresponding pixel to pixel basis. In this example, a black pixel is 1 (true) and while is 0 (false). Therefore, the pixels other than those in the probe trace area are still the electrode binary image 37. In the probe trace area, the black pixels become black in either of the electrode binary image 37 or probe trace area binary image 38, and only the white pixels become white in either of the images. Because the threshold value β is set to be greater than the threshold value α, the black pixels increase in the probe trace area compared to the electrode binary image 37.

The binary image synthesized in the image synthesizing unit 34 is stored in the image data holding unit 35 as the probe trace recognition binary image 39. The probe trace recognition binary image 39 is input in an inspection judgment section 131, which judges the probe trace.

Figure 6:
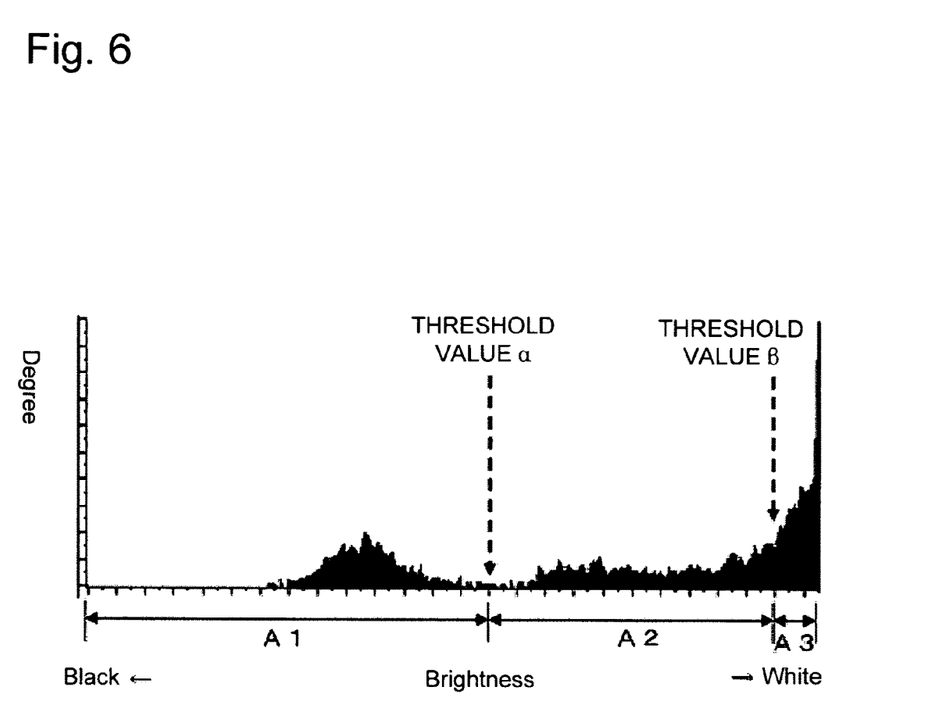
FIG. 6 is an example of a frequency distribution (histogram) showing frequencies of brightness of a pixel of an original image in a bar graph.

FIG. 6 illustrates an example of a frequency distribution (histogram) showing frequencies of brightness of a pixel of an original image in a bar graph. In the FIG. 6, the left indicates black (low brightness) and right shows white (high brightness).

As characteristics of the histogram, there are two peaks in the area (A1) of relatively low brightness and high brightness area (A3), and there is no clear crest and valley portion between both peaks (A2). The crest of low brightness area (A1) in the histogram indicates the dark component of the probe trace and the crest of the high brightness area (A3) in the histogram indicates the bright component of the background section. Further, the bright component of the probe trace and the dark component of the background section are commingled between both peaks (A2).

The binarizing unit 31 scans all pixels (or pixels in a predetermined area) in the original image 36 and obtains the histogram of brightness as shown in FIG. 6. The binarizing unit 31 analyzes the histogram and sets the threshold value α at the boundary of the areas A1 and A2. Further, the area binarizing unit 33 analyzes the histogram and sets the threshold value β at the boundary of the areas A2 and A3.

The binarizing unit 31, for example, sets a brightness of the minimum frequency between the maximal value of a low brightness and the maximal value of a high brightness as the threshold value α after smoothing the histogram. Further, the area binarizing unit 33 sets the threshold value β to a brightness between the threshold value α and the maximal value of the high brightness. For example, the area binarizing unit 33 sets the brightness at the point where the frequency is equal to the average of the frequencies of areas A2 and A3 as the threshold value β.

Figure 7:
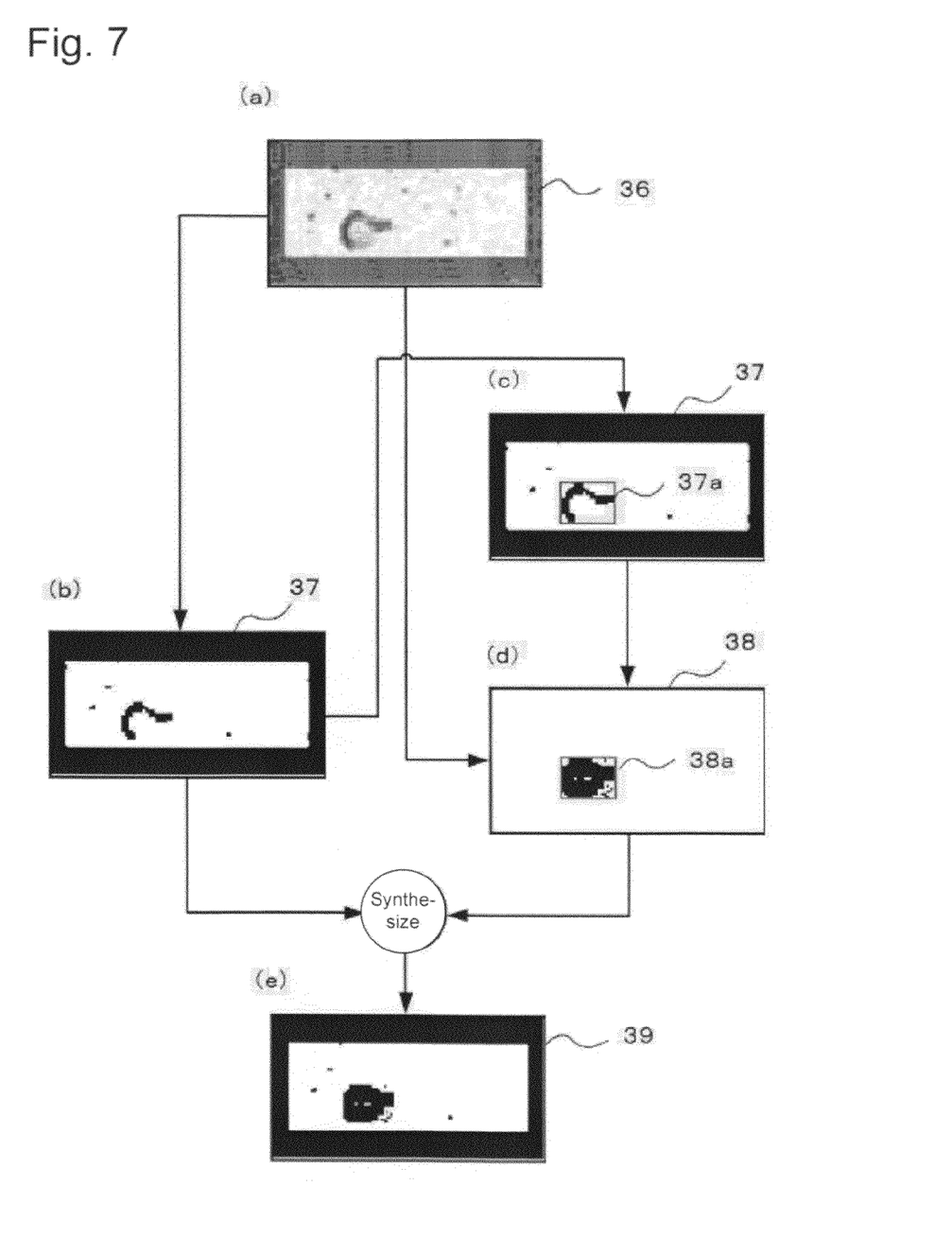
FIG. 7 is a diagram explaining an example of an image binarizing process pertaining to an embodiment.

FIG. 7 is a diagram that explains an example of the image binarizing process pertaining to the embodiment. Examples of images and their relations are illustrated from the original image 36 of (a) to the probe trace recognition binary image 39 of (e). The original image 36 is a gray scale image in multiple-tone that is taken at the imaging section 3. In the white electrode pad 8*a*, there is a large blob and irregularities of density. There are also irregularities of density in the large blob.

The electrode binary image 37 (*b*) is an image obtained by the binarizing unit 31 which binarizes the original image 36 by using the threshold value α in FIG. 6. The electrode binary image 37 has no irregularities of density in the background while the dilute section of the probe trace is missing.

The predicted probe trace area calculating unit 32 identifies and extracts the predicted probe trace area (rectangular area 37*a*) in the original image 36. The predicted probe trace area is indicated by the rectangular area 37 *a* of (c). Next, the area binarizing unit 33 binarizes the extracted probe trace area 37 using the threshold value β in FIG. 6 to obtain the probe trace area binary image 38 of (d). For the inspection of the probe trace, the image data 38*a* only in the predicted probe trace area and the data of position and size of the predicted probe trace area are the only data required and there is no need for the data in other area. Therefore, the image synthesizing process is performed by regarding the area other than the predicted probe trace area white.

The probe trace recognition binary image 39 shown in (e) is a binary image that is synthesized by taking a logical sum on a corresponding pixel to pixel basis of the electrode binary image 37 and probe trace area binary image 38. By comparing with the original image 36, it can be noted that the background section and probe trace are separated in a high accuracy, and only the probe trace is extracted.

Figure 8:
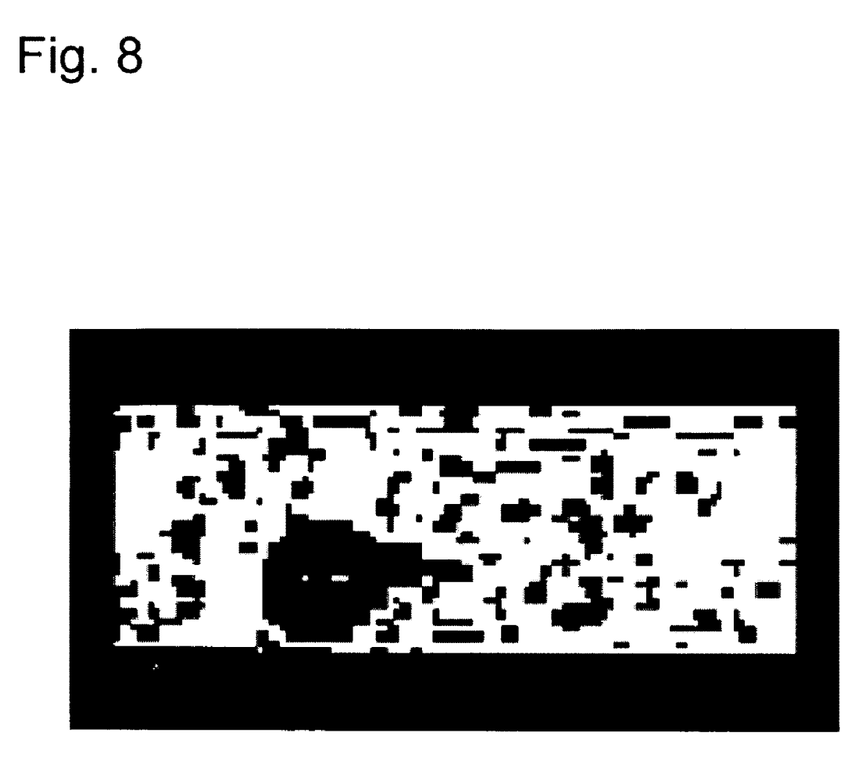
FIG. 8 is a diagram illustrating an example of a binary image obtained as a result of binarizing an original image using a second threshold value.

FIG. 8 illustrates a binary image obtained by binarizing the original image 36 using the threshold value β. In this FIG. not only the probe trace, but also the dark component in the background section are extracted, thus, it is difficult to extract only the probe trace.

Figure 9:
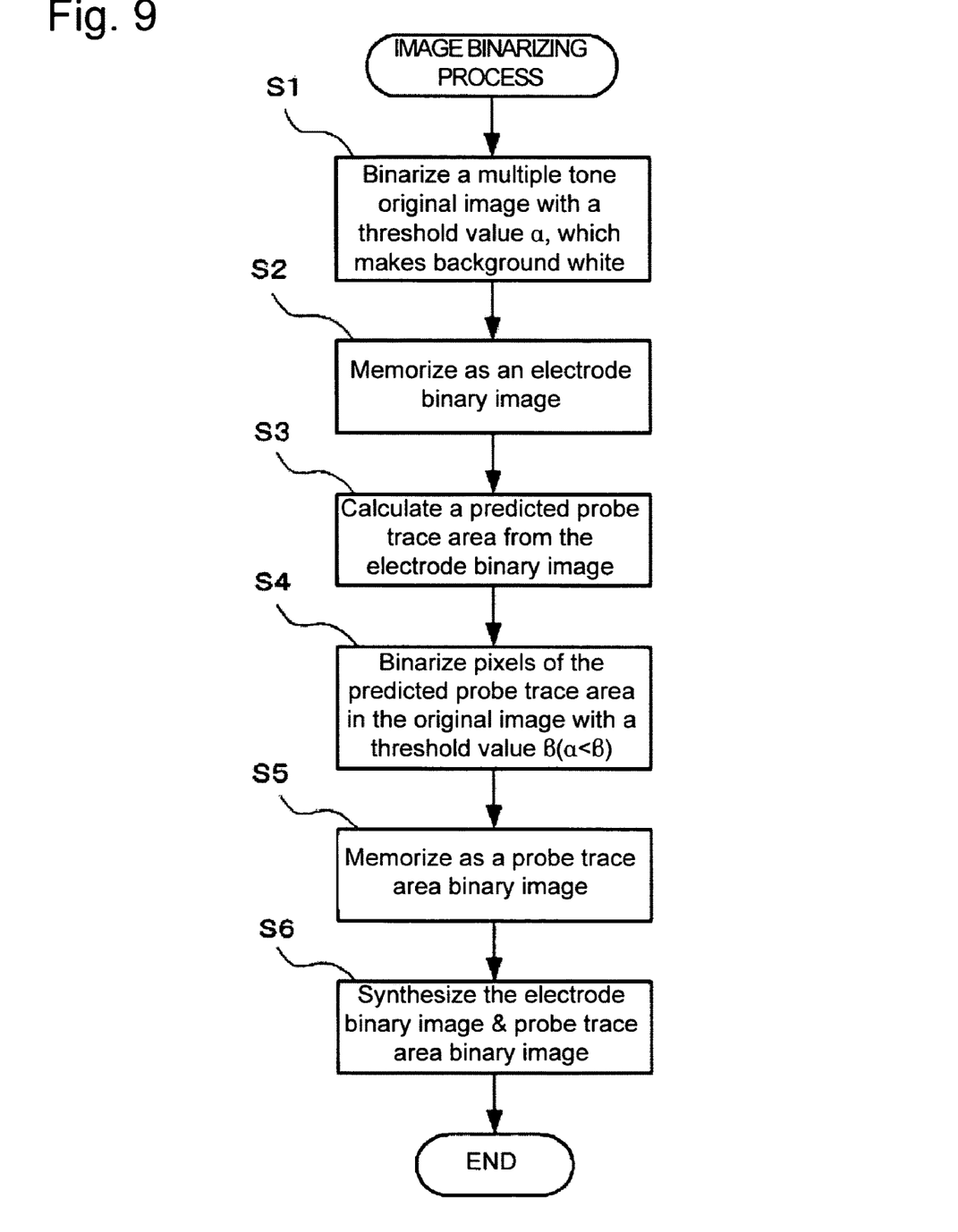
FIG. 9 is a flow chart showing an example of an operation of an image binarizing process.

Next, explained is an operation of the image processing device 2. FIG. 9 is a flowchart illustrating an example of the operation of the image binazing process.

First, the image processing device 2 (especially the control unit 21) imports the original image 36 taken by the imaging section 3 through the input output 25, and stores it in the main memory unit 22 or external memory unit 23 (image data holding unit 35), for example.

Next, the image processing device 2 (control unit 21, binarizing unit 31) binarizes the original image 36 with the threshold value α such that the irregularity of density in the background section becomes almost white (step S1).

Next, the image processing device 2 (control unit 21, binarizing unit 31) stores the obtained electrode binary image 37 in the image data holding unit 35 (external memory unit 23) (step S2).

Next, the image processing device 2 (control unit 21, predicted probe trace area calculating unit 32) obtains a rectangular area 37a circumscribing the black color area of the largest area from the electrode binary image 37 that is regarded as the predicted probe trace area (step S3).

Next, the image processing device 2 (control unit 21, area binarizing unit 33) extracts only the predicted probe trace area 37a portion and binarizes (step S4), and stores the obtained probe trace area binary image 38 in the image data holding section 35 (step S5).

Next, the image processing device 2 (control unit 21, image synthesizing unit 34) synthesizes the electrode binary image 37 and probe trace area binary image 38 by taking a logical sum on a corresponding pixel to pixel basis to generate a probe trace recognition binary image 39 as a recognition result (step S6).

The probe trace judgment section 131 determines if the inspection of chip 16 is properly performed using the probe 4 by analyzing this probe trace recognition binary image 39.

As explained above, the image binarizing method and image processing device of the embodiment obtains the predicted probe trace area from the binary image of the original image, binarizes the original image of the probe trace area with a different threshold value and synthesizes the electrode binary image and probe trace area binary image, thereby the probe trace is extracted. Because two-stages of a binarizing process are performed, the probe trace can be recognized with a high degree of accuracy without being affected by the irregularities of density in the background section.

In the embodiments described above, α and β of FIG. 6 are shown as an example of threshold values, but it is not limited to these. For example, an arbitrary value according to the characteristics of a histogram or background section of the original image 36 may be set as the threshold value α. Also, an arbitrary value according to the characteristics of a histogram or a predicted probe trace of the original image 36 may be set as a threshold value β.

Further, the probe trace area is configured in a rectangular shape; however, the probe trace area may be in other shapes corresponding to the shape of the electrode pad etc. Further, two images were synthesized by taking a logical sum of the two images; however, other synthesizing methods may be used as long as a similar effect can be achieved.

In addition, the configuration of hardware and flowcharts are only examples, and various arbitrary changes or modifications can be made.

In the embodiments described above, the inspection device 1 and image processing unit 2 are configured as a single unit. But, it is not limited to this. For example, one device may execute steps until obtaining an image with a camera and then sending the image data to another device through a network, and another device may execute the binarizing process, extract a probe trace, and determine adequacy of inspections. Similarly, it may be such that the imaging unit, image processing unit, and judgment unit are connected with a network etc, and the imaging unit obtains an image of a chip, the image processing unit generates a binary image of a probe trace by processing the image (extraction of probe trace), and a judgment unit determines adequacy of the inspection using the binary image.

The image process unit 2 of the inspection device 1 can be realized by using an ordinary computer system, instead of a dedicated system. For example, the image process unit 2 for executing the process described above may be formed by storing a program for executing the operation described above on a computer readable memory medium (e.g. flexible disk, CD-ROM, DVD-ROM etc.), distributing the medium, and installing the computer program on a computer. Further, the image process unit 2 of the present invention may also be formed by storing the computer program on a memory device in a server device on a communication network, such as the Internet, and having an ordinary computer system downloading the program etc.

Further, in a case when each of functions described above is realized by the role sharing of an OS (operating system) and an application program, or cooperation of an OS and an application program, only the application program section may be stored in a memory medium or memory device.

Further, the computer program described above may be superimposed on a carrier wave and delivered through a communication network.

Further, the computer program described above may be superimposed on a carrier wave and delivered through a communication network.

In the embodiments described above, the binarizing method and binarizing process device for obtaining a probe trace formed on an electrode has been explained. The present invention is not limited to this. The present invention can be widely applied for extracting and determining a trace which is formed from contacting one object to another.

This application claims priority to Japanese patent application No. 2006-137055, filed on May 16, 2006 and claims, specification, figures, abstract of the Japanese application is incorporated herein by reference in its entirety.

INDUSTRIAL APPLICABILITY

The present invention is applicable to an inspection device etc. for inspecting a semiconductor chip manufactured in a semiconductor manufacturing process etc.

What is claimed is:

1. An image binarizing method for binarzing an original image of an electrode pad on a substrate, the method comprising the steps of:
processing an electrode image to generate a binary image of a single entire electrode pad by binarizing the original image with a first threshold value;
extracting a contact trace area including a portion that is predicted to be a trace of an object that contacted the electrode from the binary image of the electrode pad generated in the step of processing the electrode image, where the contract trace area is a part of the electrode;

processing a contact trace image to generate a contact trace area binary image by binarizing an image of an area corresponding to the contact trace area obtained in the step for extracting the contact trace area with a second threshold value that is different from the first threshold value; and synthesizing the binary image of the single entire electrode pad and the contact trace area binary image, by taking a logical sum on a corresponding pixel to pixel basis;

wherein the first threshold value in the step for processing the electrode image is a brightness between a maximal value of a low brightness and a maximal value of a high brightness in a frequency distribution of brightness of a pixel of the original image; and the second threshold value in the step for processing the contact trace image is a brightness between the first threshold value and the maximal value of the high brightness;

wherein the first threshold value in the step for processing the electrode image is a brightness of minimal frequency between the maximal value of the low brightness and the maximal value of the high brightness.

2. The image binarizing method according to claim 1, wherein the step of synthesizing comprises synthesizing the electrode binary image and the contact trace area binary image on a corresponding pixel to pixel basis.

3. The image binarizing method according to claim 1, wherein the step of extracting the contact trace area comprises making an area circumscribing a black color area that comprises a largest area in the electrode binary image into the contact trace area.

4. The image binarizing method according to claim 1, wherein the step of extracting the contact trace area comprises making a rectangular area circumscribing a black color area that comprises a largest area in the electrode binary image into the contact trace area.

5. An image processing device for binarizing an original image of an electrode pad on a substrate, the image processing device comprising;

an electrode image processing unit for generating a binary image of a single entire electrode pad by binarizing the original image with a first threshold value;

a contact trace area extracting unit for extracting an image of a contact trace area including a portion that is predicted to be a trace of an object that contacted the electrode from the binary image of the electrode, where the contract trace area is a part of the electrode;

a contact trace image processing unit for generating a contact trace area binary image by binarizing the image of the contact trace area extracted by the contact trace area extracting unit with a second threshold value that is different from the first threshold value; and an image synthesizing unit for synthesizing the binary image of the single entire electrode pad and the contact trace area binary image, by taking a logical sum on a corresponding pixel to pixel basis;

wherein the first threshold value in the electrode image processing unit is a brightness between a maximal value of a low brightness and a maximal value of a high brightness in a frequency distribution of brightness of a pixel of the original image; and the second threshold value in the contact trace image processing unit is a brightness between the first threshold value and the maximal value of the high brightness;

wherein the first threshold value in the electrode image processing unit is a brightness of a minimal frequency between the maximal value of the low brightness and the maximal value of the high brightness.

6. The image processing device according to claim 5, wherein the image synthesizing unit synthesizes the electrode binary image and the contact trace area binary image on a corresponding pixel to pixel basis.

7. The image processing device according to claim 5, wherein the contact trace area extracting unit makes an area circumscribing a black color area that comprises a largest area in the electrode binary image into the contact trace area.

8. The image processing device according to claim 5, wherein the contact trace area extracting unit makes a rectangular area circumscribing a black color area that comprises a largest area in the electrode binary image into the contact trace area.

9. A computer program product for operating a computer, comprising;

a non-transitory computer readable medium for operating:

an electrode image processing unit for generating a binary image of a single entire electrode pad by binarizing an original image captured by imaging an electrode pad on a substrate with a first threshold value;

a contact trace area extracting unit for extracting an image of a contact trace area including a portion that is predicted to be a trace of an object that contacted the electrode from the binary image of the electrode pad, the contact trace area being a part of the electrode;

a contact trace image processing unit for generating a contact trace area binary image by binarizing the image of the area extracted by the contact trace area extracting unit with a second threshold value that is different from the first threshold value; and an image synthesizing unit for synthesizing the binary image of the single entire electrode pad and the contact trace area binary image, by taking a logical sum on a corresponding pixel to pixel basis;

wherein the first threshold value in the electrode image processing unit is a brightness between a maximal value of a low brightness and a maximal value of a high brightness in a frequency distribution of brightness of a pixel of the original image; and the second threshold value in the contact trace image processing unit is a brightness between the first threshold value and the maximal value of the high brightness;

wherein the first threshold value in the electrode image processing unit is a brightness of a minimal frequency between the maximal value of the low brightness and the maximal value of the high brightness.

* * * * *

UNITED STATES PATENT AND TRADEMARK OFFICE
CERTIFICATE OF CORRECTION

| | |
|---|---|
| PATENT NO. | : 8,345,951 B2 |
| APPLICATION NO. | : 12/227301 |
| DATED | : January 1, 2013 |
| INVENTOR(S) | : Sato |

It is certified that error appears in the above-identified patent and that said Letters Patent is hereby corrected as shown below:

In the specification, column 1, line 9, please delete "137005," and add -- 137055, --

In the specification, column 5, line 11, please add -- 15 -- after "unit"

Signed and Sealed this
Twenty-fourth Day of September, 2013

Teresa Stanek Rea
*Deputy Director of the United States Patent and Trademark Office*